United States Patent
Akiyama et al.

(10) Patent No.: US 6,262,759 B1
(45) Date of Patent: Jul. 17, 2001

(54) METHOD AND APPARATUS FOR FORMING AN IMAGE USING SIGNALS SYNCHRONIZED WITH SCANNING

(75) Inventors: Satoshi Akiyama, Yokohama; Kenjiro Hori, Tokorozawa; Yoshimi Kuramochi, Toride; Akihiro Shibata, Toride; Tetsuo Kishida, Toride; Koichi Suzuki, Toride, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/025,745

(22) Filed: Feb. 18, 1998

(30) Foreign Application Priority Data

Feb. 18, 1997 (JP) .................................. 9-033832

(51) Int. Cl.[7] .................................. B41J 2/435
(52) U.S. Cl. .......................................... 347/250; 347/235
(58) Field of Search .................................. 347/235, 250, 347/248, 262, 264, 115; 358/453; 271/10.01

(56) References Cited

U.S. PATENT DOCUMENTS

| | | | |
|---|---|---|---|
| 4,712,118 | 12/1987 | Seto et al. ......................... | 347/248 |
| 4,761,662 | 8/1988 | Yoshimoto et al. .............. | 347/248 |
| 4,935,615 | 6/1990 | Eiichi et al. ....................... | 250/205 |
| 4,965,590 | * 10/1990 | Yamazaki .......................... | 347/262 |
| 5,351,074 | * 9/1994 | Kadowaki et al. ................ | 347/115 |
| 5,436,735 | * 7/1995 | Tanabe et al. ..................... | 358/453 |
| 5,457,487 | * 10/1995 | Sakaki et al. ...................... | 347/248 |
| 5,504,517 | 4/1996 | Takashi et al. .................... | 347/246 |
| 5,676,363 | * 10/1997 | Kishida et al. .................... | 271/10.01 |

* cited by examiner

*Primary Examiner*—N. Le
*Assistant Examiner*—Hai C. Pham
(74) *Attorney, Agent, or Firm*—Fitzpatrick, Cella, Harper & Scinto

(57) ABSTRACT

A method and apparatus for forming an image reduce the processing load on a video controller. A CPU causes a counter to start counting the optical beam detection signals of a photodiode in accordance with a signal which indicates the leading edge of a sheet of recording paper received from a TOP sensor. Comparators compare the count value issued from the counter with the values set by the CPU at registers. Based on the comparison result, an F/F sets Q output. Thus, a BD signal is issued through a gate during a period specified by the values set at the registers. The use of the BD signal reduces the processing load on the video controller which generates and transfers an image signal.

28 Claims, 12 Drawing Sheets

| SIZE OF RECORDING PAPER [mm] | REQUIRED BD VALUE |
|---|---|
| A4 (210.0×297.0) | 3508 |
| A5 (210.0×148.5) | 1754 |
| B5 (182.0×257.0) | 3036 |
| POSTCARD (100.0×148.0) | 1749 |

(300 dpi)

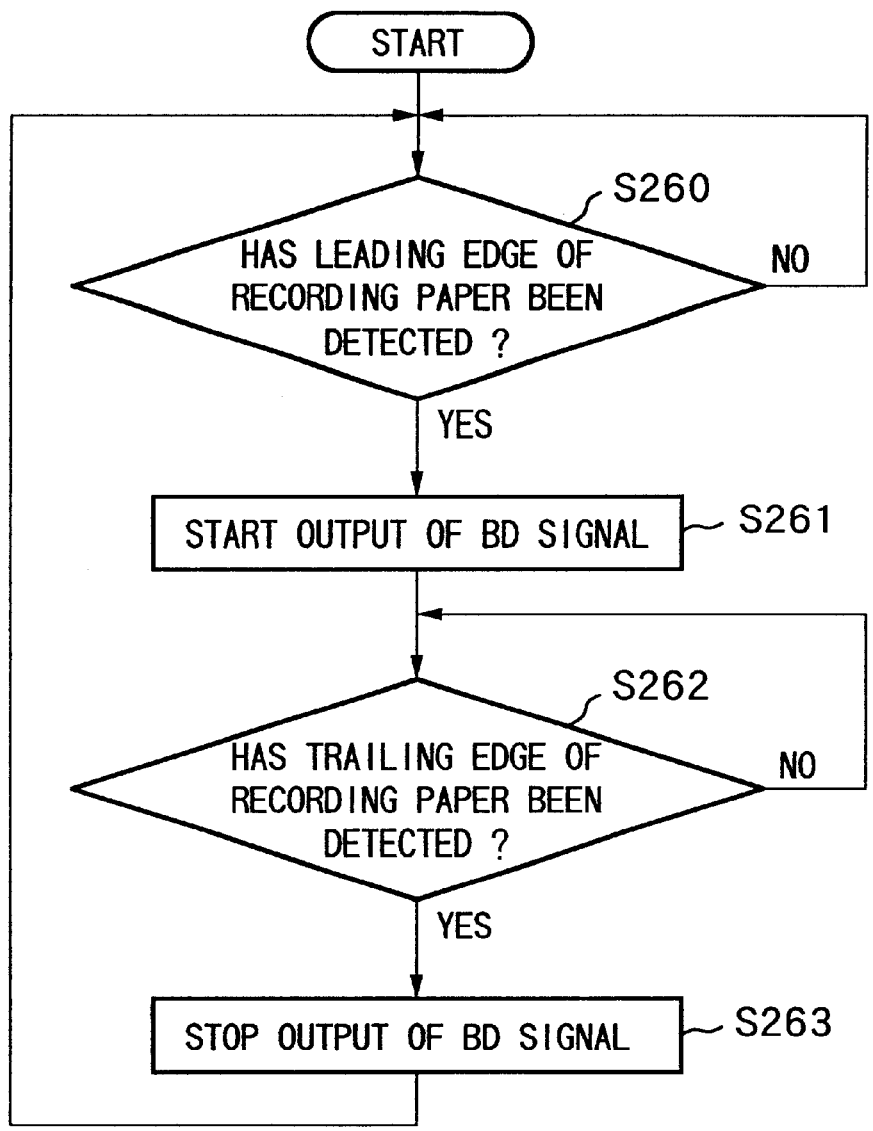

METHOD AND APPARATUS FOR FORMING AN IMAGE USING SIGNALS SYNCHRONIZED WITH SCANNING

BACKGROUND OF THE INVENTION

The present invention relates to an image forming apparatus and a method thereof, and, more particularly, to a method and apparatus for forming an image by, for example, scanning with an optical beam.

A video controller of an image forming apparatus generates a main scanning synchronization signal and a sub-scanning synchronization signal according to a signal indicating the start of main scanning and the signal indicating the leading edge of a sheet of recording paper which are received from a printer engine, then sends image signals based on the these two synchronization signals to the printer engine to form an image on a recording paper.

The art described above poses a problem in that the video controller must generate two synchronization signals, namely, one for main scanning and the other for sub-scanning, in accordance with the signal indicative of the start of main scanning and the signal indicative of the leading edge of recording paper in addition to performing the image processing for converting the image signal received from an external device to an image signal for printing.

SUMMARY OF THE INVENTION

The present invention has been made with a view toward solving the problems mentioned above, and it is an object of the present invention to provide a method and apparatus for forming an image which reduce the processing load on a video controller.

According to an aspect of the present invention, there is provided an image forming apparatus for forming an image by optical beam scanning, the image forming apparatus having: first detecting means for detecting the scanning position of an optical beam; instructing means which instructs counting means to start counting the signals issued from the first detecting means; determining means which determines whether the count value issued from the counting means lies within a predetermined range; and output means which issues the signal received from the first detecting means as a synchronization signal for forming an image.

According to another aspect of the present invention, the image forming apparatus forms an image by repeatedly scanning an image bearing member by an optical beam, the image forming apparatus having generating means for generating a synchronization signal which synchronizes with the scanning of the optical beam, and masking means for partly masking the synchronization signal to issue the synchronization signal only during an image forming period.

According to still another aspect of the present invention, there is provided an image forming method for an image forming apparatus whereby to form an image by scanning with an optical beam, the image forming method including: a detecting step for detecting the scanning position of the optical beam; an instructing step for instructing counting means to start counting the signals issued in the first detecting step; a determining step for determining whether the count value issued from the counting means lies within a predetermined range; and an output step for issuing the signal issued in the first detecting step as the synchronization signal for forming an image.

In a preferred form, the image forming method forms an image by repeatedly scanning an image bearing member with an optical beam, and it partly masks the synchronization signal to issue the synchronization signal only during an image forming period.

Other aspects and advantages of the present invention will become apparent from the following detailed description taken in connection with the accompanying drawings.

BRIEF DESCRIPTION OF THE DRAWINGS

FIG. 13 is a flowchart illustrating an example of the processing implemented by the CPU shown in FIG. 2.

DESCRIPTION OF THE PREFERRED EMBODIMENTS

An image forming apparatus of an embodiment of the present invention will now be explained in detail with reference to the accompanying drawings.

<First Embodiment:>

Figure 1:
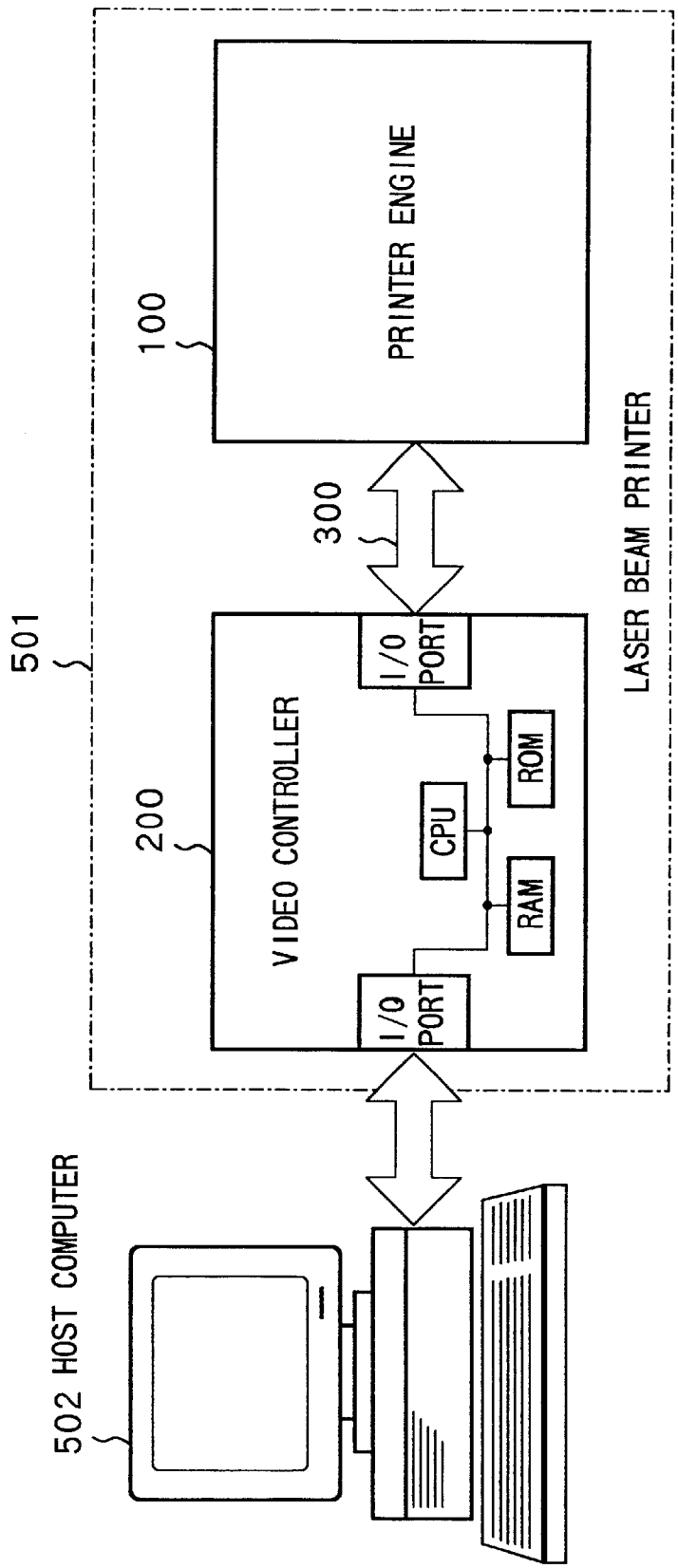
FIG. 1 is a block diagram showing a configuration example of a laser beam printer which is an embodiment in accordance with the present invention.

FIG. 1 is a block diagram showing an example of the configuration of a laser beam printer 501 of an embodiment in accordance with the invention.

A video controller 200 is comprised primarily of: a CPU, a ROM wherein control programs and other types of data are stored, a RAM used as a work memory or the like, and I/O ports; it mainly controls the entire apparatus, performs the image processing for converting the image data received from a host computer 502 to image data for printing, and sends the processed image data to a printer engine 100. The video controller may exist outside the laser beam printer 501; in this case, it exchanges the data containing commands and statuses and various types of signals with the laser beam printer 501 via a general-purpose or dedicated interface or a signal conductor.

(Image-forming Processing)

Figure 2:
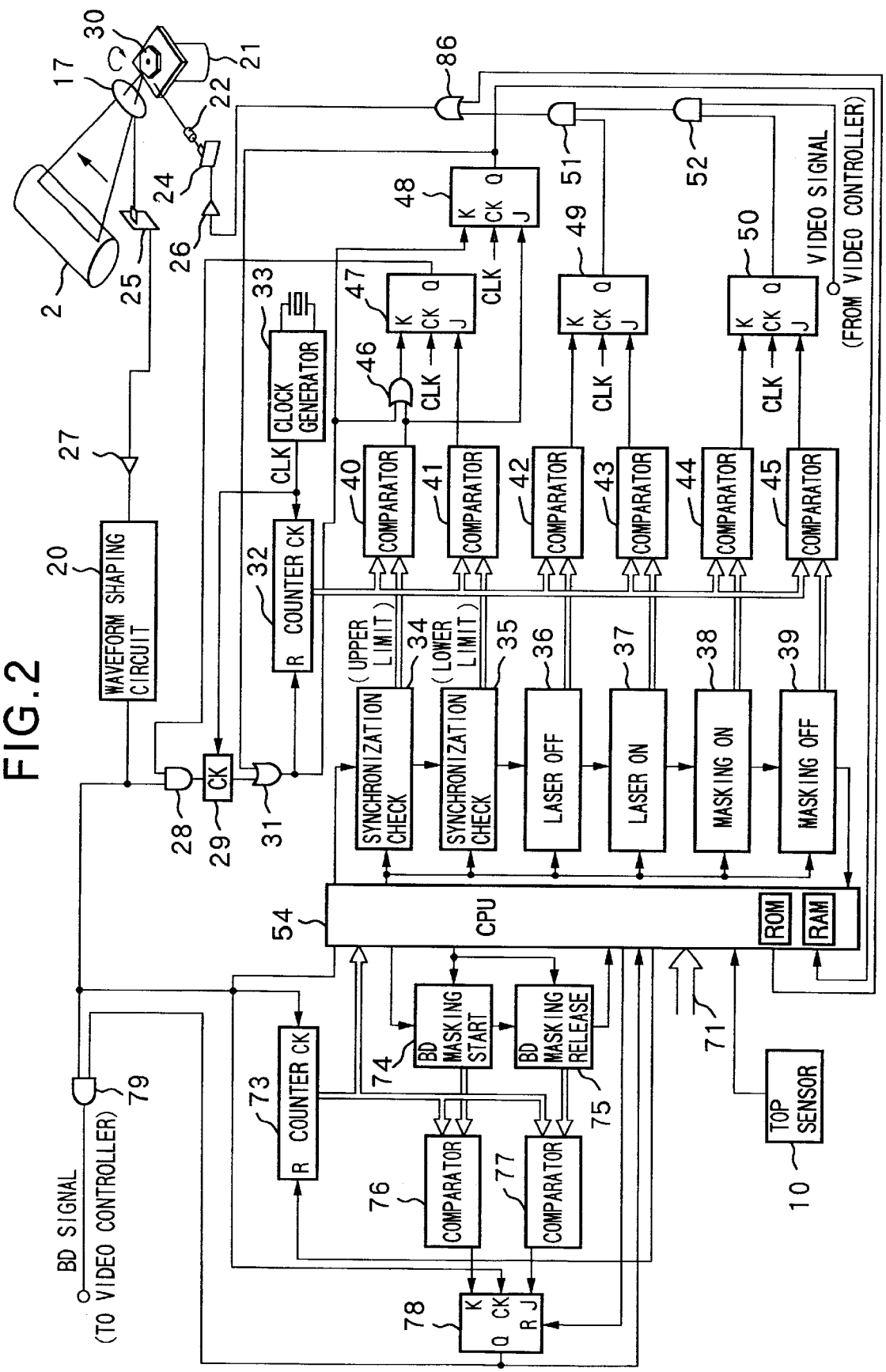
FIG. 2 is a block diagram showing a configuration example of a printer engine shown in FIG. 1.
Figure 3:
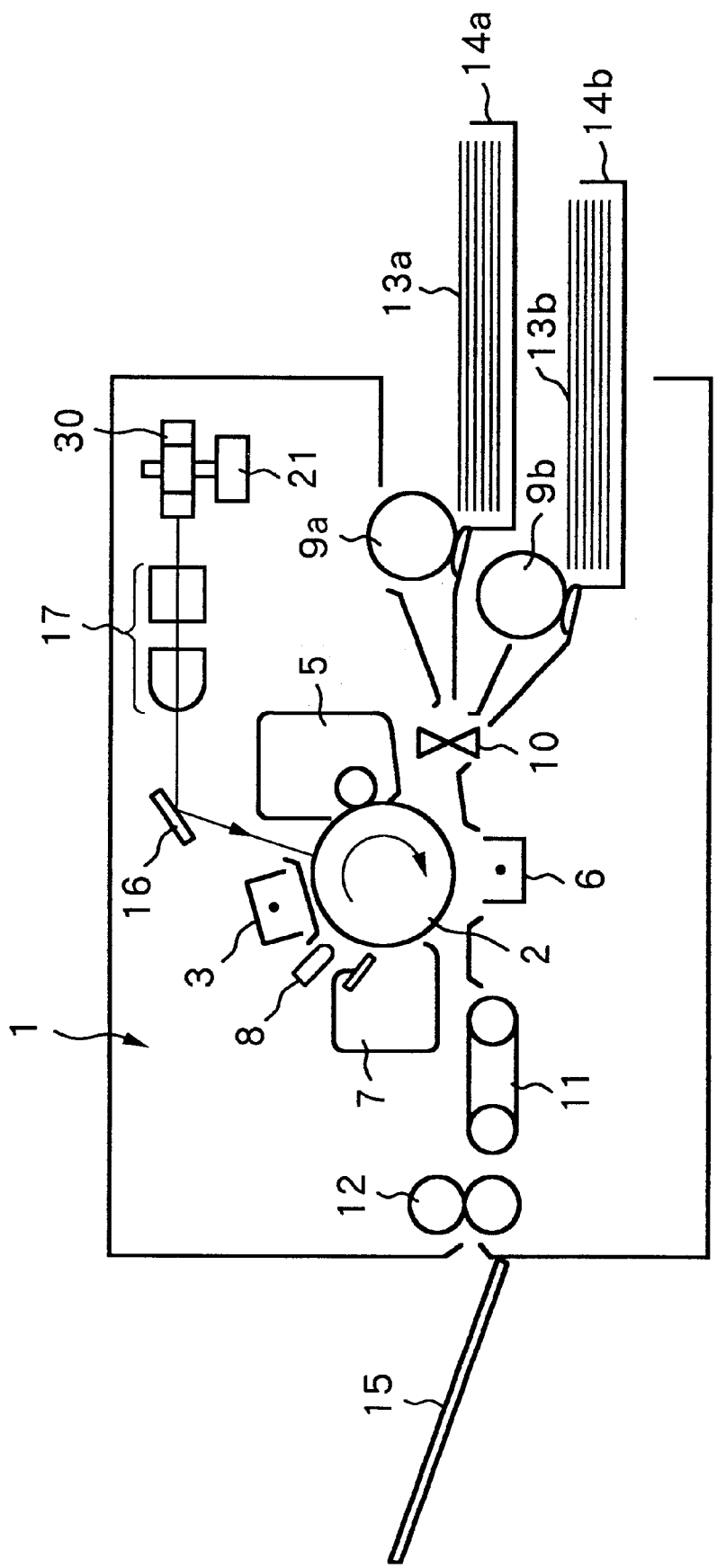
FIG. 3 is a general view of the laser beam printer shown in FIG. 1.

FIG. 2 is a block diagram showing an example of the configuration of the printer engine 100 shown in FIG. 1; and FIG. 3 is a general sectional view of the laser beam printer 501.

The video controller 200 determines whether a fixing device 12 has reached a proper temperature, whether recording papers 13a and 13b have been set in recording paper cassettes 14a and 14b, or other internal states to decide if the apparatus is ready to print whenever the power of the apparatus is turned ON. If the apparatus is ready to print, then the video controller 200 starts printing operation by sending instructions, as necessary, to blocks in the apparatus to start printing.

The moment the printing operation starts, an exposure lamp 8, a charging device 3, and a transferring device 6 are turned ON, and a photosensitive drum 2 is rotated in the direction indicated by the arrow to initialize the surface potential of the photosensitive drum 2. A scanner motor 21 for rotating a rotary mirror 30 is actuated, and a CPU 54 causes a semiconductor laser device 24 to illuminate via an OR gate 86.

The laser beam emitted from the semiconductor laser 24 is periodically applied to a photodiode 25 which issues a signal each time it receives the laser beam. The signal is amplified through an amplifier 27 before it is supplied to a waveform shaping circuit 20 which shapes the amplified signal into a pulse. When it has been determined that the frequency of the pulses is normal by the frequency check which will be discussed later, the CPU 54 decides that the revolution of the scanner motor 21 has been stabilized, and it terminates the drive of the semiconductor laser device 24 via the OR gate 86 and also opens an AND gate 52 so that the video signal received from the video controller 200 is sent to a video amplifier 26.

When the surface potential of the photosensitive drum 2 has been initialized and the revolution of the scanner motor 21 has been stabilized, the recording paper is fed from the recording paper cassette 14a or 14b by a paper feed roller 9a or 9b. The moment the leading edge of the recording paper reaches a TOP sensor 10, a main scanning synchronization signal (BD signal), which will be discussed later, is transmitted to the video controller 200. The video controller 200 issues video signals for printing in synchronization with the BD signal.

The video signal is required to provide dot information in synchronization with the deflective scanning in the main scanning direction of the laser beam. Hence, generating the video signal requires a signal which indicates that the scanning by the laser beam has reached a predetermined position; this signal is the BD signal.

The video signal which has been amplified through the video amplifier 26 via AND gates 52 and 51, and the OR gate 86 drives the semiconductor laser device 24. The laser beam emitted from the semiconductor laser device 24 is shaped into a beam through a lens 22 and reflected by the rotary mirror 30, then passes through an f-θ2 lens 17 and a mirror 16 and scans the photosensitive drum 2 to form an electrostatic latent image. The formed latent image is developed by a developing device 5 into a toner image and transferred onto the recording paper by the transferring device 6. The recording paper onto which the toner image has been transferred is carried by a carrying belt 11. After the toner image has been fixed by the fixing device 12, the recording paper is ejected onto a paper ejection tray 15.

Another block shown in FIG. 2 will now be described. A counter 32 is reset when the output of an OR gate 31 is switched to H-level; it counts basic clocks CLK generated by a clock generator 33 and issues a 10-bit count value from a comparator 40 to a comparator 45. The values obtained by conversion into the basic clock CLK count values are set in 10-bit shift registers 34 through 39, respectively, by the CPU 54. The comparators 40 through 45 respectively compare the count value output by the counter 32 with the values set in the shift registers 34 through 39, and issue signals according to their comparison results.

J-K flip-flops (JK-F/F) 47 through 50 set Q outputs an H-level in synchronization with a clock input CLK when a J input is at an H-level and a K input is at an L-level, while they set the Q outputs an L-level in synchronization with the clock input when the J input is at an L-level and the K input is at an H-level.

The CPU 54 is, for example, a one-chip microcomputer; it controls the operation of the printing section according to a program stored in the built-in ROM, using the built-in RAM as a work memory. To be more specific, the CPU 54, for example, determines the numerical values to be set at the shift registers 34 through 39 according to information such as recording resolution or the size of the recording paper and sets the determined values in the respective shift registers; it also carries out other types of control.

For instance, the shift registers 36, 37, the comparators 42, 43, the JK-F/F 49, and the AND gate 51 are used to prevent the laser beam from being applied to any area other than the latent image forming area of the photosensitive drum 2 and the area in the vicinity of the photodiode 25 (hereinafter referred to as an irradiative area) after the printing is started. Specifically, the CPU 54 causes the Q output of the JK-F/F 49 to issue an H-level signal to open the AND gate 51 so as to allow the video signal to enter the video amplifier 26 during a period in which the laser beam emitted from the semiconductor laser device 24 scans the irradiative area according to the values set at the shift registers 36 and 37; the CPU 54 causes the Q output of the JK-F/F 49 to issue an L-level signal to close the AND gate 51 so as to prevent the video signal from entering the video amplifier 26 during a period other than the one mentioned above.

Likewise, for instance, the shift registers 38, 39, the comparators 44, 45, the JK-F/F 50, and the AND gate 52 are used to prevent the laser beam from being applied to any area other than the area which corresponds to the one where an image can be formed on the recording paper (hereinafter referred to as A page area) after the printing is started. Specifically, the CPU 54 causes the Q output of the JK-F/F 50 to issue an H-level signal to open the AND gate 52 so as to allow the video signal to enter the video amplifier 26 during a period in which the laser beam emitted from the semiconductor laser device 24 scans the page area according to the values set at the shift registers 38 and 39; the CPU 54 causes the Q output of the JK-F/F 50 to issue an L-level signal to close the AND gate 52 so as to prevent the video signal from entering the video amplifier 26 during a period other than the one mentioned above.

(Cycle check of pulses)

The cycle check of the pulses will now be described. Each time a pulse is issued, if the pulse cycle has become shorter than a specified value, then a value (lower limit value) indicative of the range wherein the formation of an image is not affected is set in the shift register 35. On the other hand, each time a pulse is issued, if the pulse cycle has become longer than a specified value, then a value (upper limit value) indicative of a range wherein the formation of an image is not affected is set in the shift register 34.

Thus, when the count value of the counter 32 reaches the lower limit value, the output of the comparator 41 switches to an H-level. This causes the Q output of the JK-F/F 47 to be switched to an H-level in synchronization with the basic clock CLK, so that an AND gate 28 transmits the pulse output from the waveform shaping circuit 20 to a pulse synchronizer (CK) 29.

When the photodiode 25 issues a signal, namely, a detection signal, which indicates that the laser beam has been detected, an H-level signal is supplied to a reset terminal R of the counter 32 via the AND gate 28, CK 29, and the OR gate 31 so as to reset the counter 32. At the same time, the H-level signal is supplied also to the K terminals of the JK-F/F 47 and 48, so that the Q outputs of the JK-F/F 47 and 48 are switched to the L-level.

If the count value on the counter 32 reaches the upper limit value with no detection signal issued from the photodiode 25, then the output of the comparator 40 is switched to an H-level. This causes H-level signals to be applied to the K terminals of the JK-F/F 47 and the J terminal of the JK-F/F 48; therefore, the Q output of the JK-F/F 47 is switched to an L-level, while the Q output of the JK-F/F 48 is switched to an H-level.

When the output of the JK-F/F 48 is switched to H15 level, the output of the OR gate 31 is accordingly switched to the H-level, and the counter 32 is cleared. Further, the output of the OR gate 31 is applied also to the K terminal of the JK-F/F 48, so that the output of the JK-F/F 48 is switched to an L-level at the next CLK. The CPU 54 detects that the output of the JK-F/F 48 has switched to the H-level and determines that the pulse cycle is not in the vicinity of the specified cycle.

(Output control of BD signal)

The output control of the BD signal will now be described. A 12-bit counter 73 counts the number of pulses at the rise or fall of a pulse and outputs the count value to comparators 76 and 77. If the output of the TOP sensor 10 is an L-level, i.e. if recording paper as not been detected by the TOP sensor 10, then the CPU 54 sends a reset signal (L-level) to the counter 73, the count value on the counter 73 being zero.

The CPU 54 sets the values, which are obtained by converting the size of the recording paper into a number of pulses, at 12-bit shift registers 74 and 75. The comparators 76 and 77 respectively compare the values set at the shift registers 74 and 75 with the output of the counter 73 and output values based on their comparison results.

An L-level signal applied to the R terminal of a JK-F/F 78 sets the Q output at an L-level.

When the CPU 54 determines from the output received from the TOP sensor 10 that the leading edge of the recording paper has reached the TOP sensor 10, it switches the signal to be sent to the counter 73 to an H-level, so that the counter 73 starts counting from zero. The moment the count value on the counter 73 reaches the value set at the shift register 75, the output of the comparator 77 (the J terminal of JK-F/F 78) is switched to an H-level, and the output of the JK-F/F 78 will be switched to an H-level by the next pulse. Hence, an AND gate 79 opens and the pulse is output as the BD signal which is sent to the video controller 200, etc.

When the count value on the counter 73 reaches the value set at the shift register 74, the output of the comparator 76 (the K terminal of the JK-F/F 78) is switched to an H-level and the output of the JK-F/F 78 is switched to an L-level by the next pulse. This causes the AND gate 79 to close, so that the BD signal is no longer issued.

The values set at the shift registers 74 and 75, namely, the value for starting the BD masking and the value for clearing the BD masking, are determined by the size of the recording paper as mentioned previously. For example, if the recording resolution is 300 dpi and the size of the recording paper is A4, then a value 1 is set as the BD signal mask clearing value at the shift register 75 and a value 3509 is set as the BD signal mask starting value at the shift register 74. More specifically, the number of pulses of the BD signal, i.e. the number of lines, necessary for one A4-size sheet of recording paper measuring 297 mm long is 3508; therefore, the number of pulses of the BD signal (hereinafter referred to a BD number in some cases) which corresponds to the value 3508 obtained by subtracting 1 (the BD signal mask clearing value) from 3509 (the BD signal mask starting value) will be issued.

The values set at the shift registers 74 and 75 may be the values given by the video controller 200. In this case, the video controller 200 sends out the BD number, which corresponds to the number of pulses issued from the moment the leading edge of the recording paper reaches the TOP sensor 10 to the moment the video signal is issued, as the BD signal mask clearing value, and the BD number, which corresponds to the number of pulses issued from the moment the issuance of the video signal is begun to the end of the video signals of the image for one sheet or recording paper, as the required BD number (see reference numeral 71 shown in FIG. 2). The CPU 54 sets the BD signal mask clearing value received from the video controller 200 at the shift register 75, and sets the value obtained by adding the BD signal mask clearing value and the required BD number at the shift register 74 as the BD signal mask starting value.

The required BD number and the BD signal mask clearing value can be specified for each recording paper cassette of the apparatus through the video controller 200 or the like. It is also possible to specify in advance, through the video controller 200 or the like, the required BD number and the BD signal mask clearing value for each fixed-size recording paper to handle a plurality of fixed-size recording papers. This enables the CPU 54 to set the values, which correspond to a new required BD number and a new BD signal mask clearing value specified beforehand, in the shift registers 74 and 75 if the size of the recording paper placed in a recording paper cassette is changed. The size of recording paper may be detected by such methods as one wherein the opening/closing of a size detecting window provided on the recording paper cassette is optically read.

It is further possible to prepare two different modes, namely, a first mode and a second mode, and to switch between the two modes through a control panel (not shown) of the apparatus or through the video controller 200: in the first mode, the output of the BD signal is inhibited by setting, for example, 4096 at the shift register 75 and 0 at the shift register 74 until the video controller 200 gives an instruction, or the printing operation is inhibited so that the printing operation is not started by the video controller 200 when proper setting has not been made; and in the second mode, established values (e.g. the values for an A4-size recording paper) are set at the shift registers 74 and 75 by the CPU 54 so that the printing operation can be started even when no instruction is received from the video controller. When the first mode is switched to the second mode, the CPU 54 sets the established values at the shift registers 74 and 75.

The CPU 54 also monitors the output of the JK-F/F 78, and if the output is an L-level, the CPU 54 notifies the video controller 200 that no BD signal is being output. When the video controller 200 requests to stop the output of the BD signal, the CPU 54 switches the reset signal of the JK-F/F 78 to an L-level to close the AND gate 79 so as to prevent the BD signal from being issued.

(Processing in Video Controller)

The processing in the video controller will now be described. Hitherto, the video controller has been generating a line synchronization signal and a page synchronization signal, which define the range wherein an image can be formed on a sheet or recording paper, in accordance with the BD signal indicative of the start of main scanning and the output signal of the TOP sensor 10 indicative of the leading edge of the recording paper, then sending a video signal based on the two synchronization signals to a printer engine.

According to the embodiment, however, when the printer engine 100 issues the BD signal, it means that the scanning position of the laser beam, i.e. the position of the record scanning, is within the area in the sub-scanning direction in which the recording is possible (within a sheet of recording paper); when no BD signal is being issued, it means that the scanning position of the laser beam is out of the area in the sub-scanning direction in which the recording is possible. Hence, the video controller 200 can find the area wherein the recording in the sub-scanning direction is possible by determining whether the BD signal is being issued, and it is able to send a video signal to the printer engine 100 at a proper timing by generating only the line synchronization signal according to the BD signal.

In other words, according to the embodiment, the need of the processing in the video controller for generating the page synchronization signals can be obviated, thus achieving reduced processing load on the video controller.

(Paper Feed Control)

Figure 4:
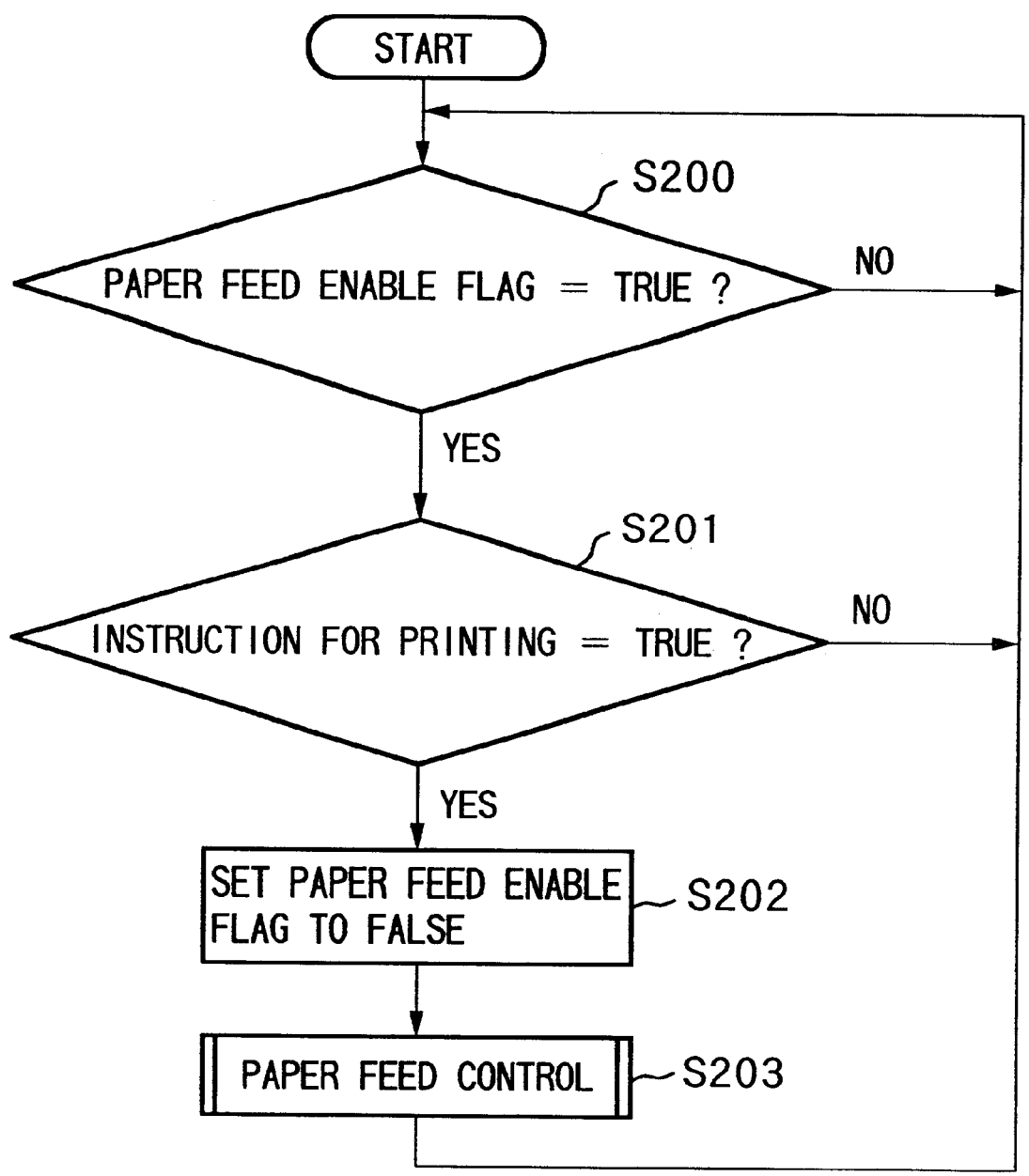
FIG. 4 a flowchart illustrating a processing procedure related to first paper feed control.
Figure 5:
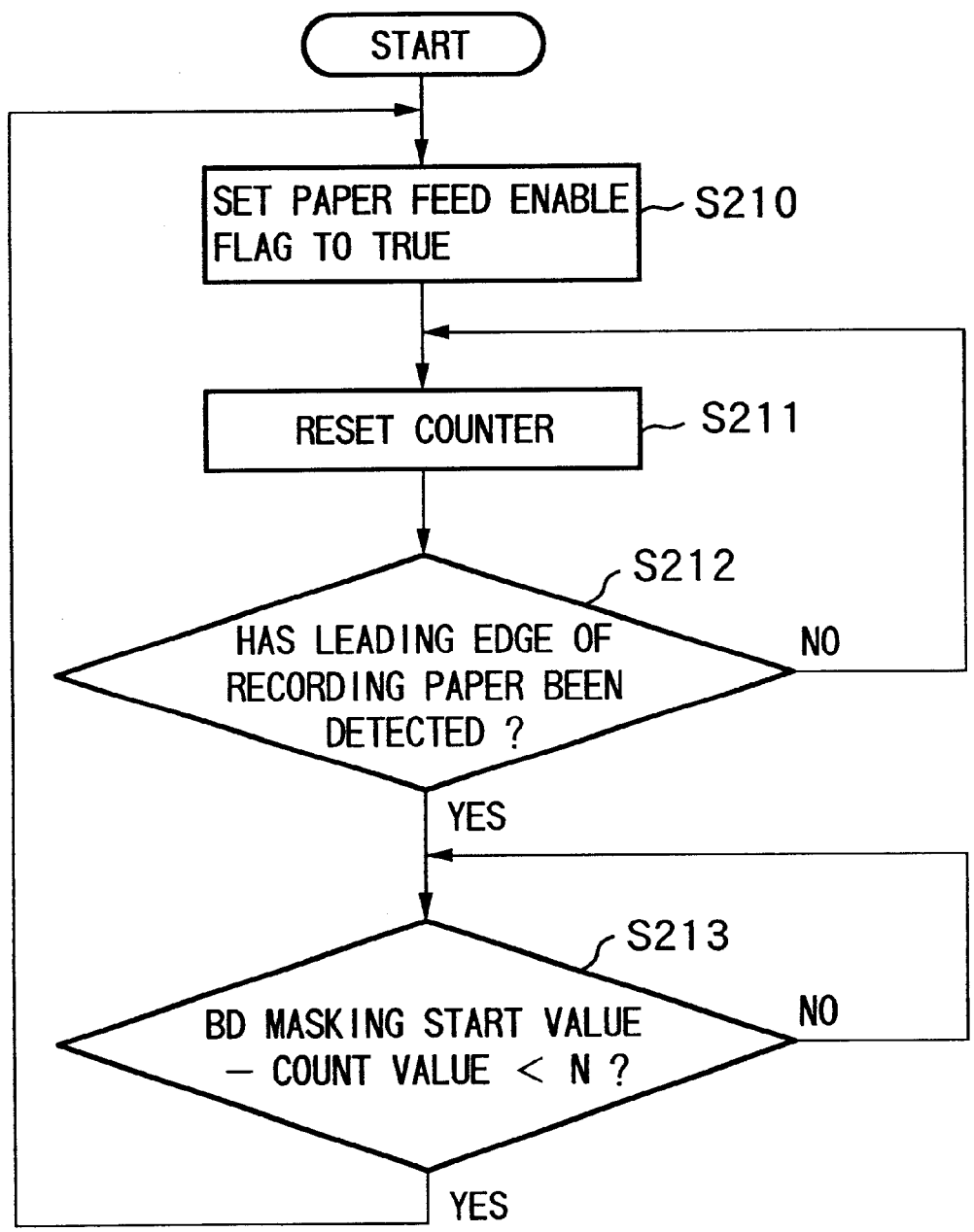
FIG. 5 a flowchart illustrating a processing procedure related to second paper feed control.
Figure 6:
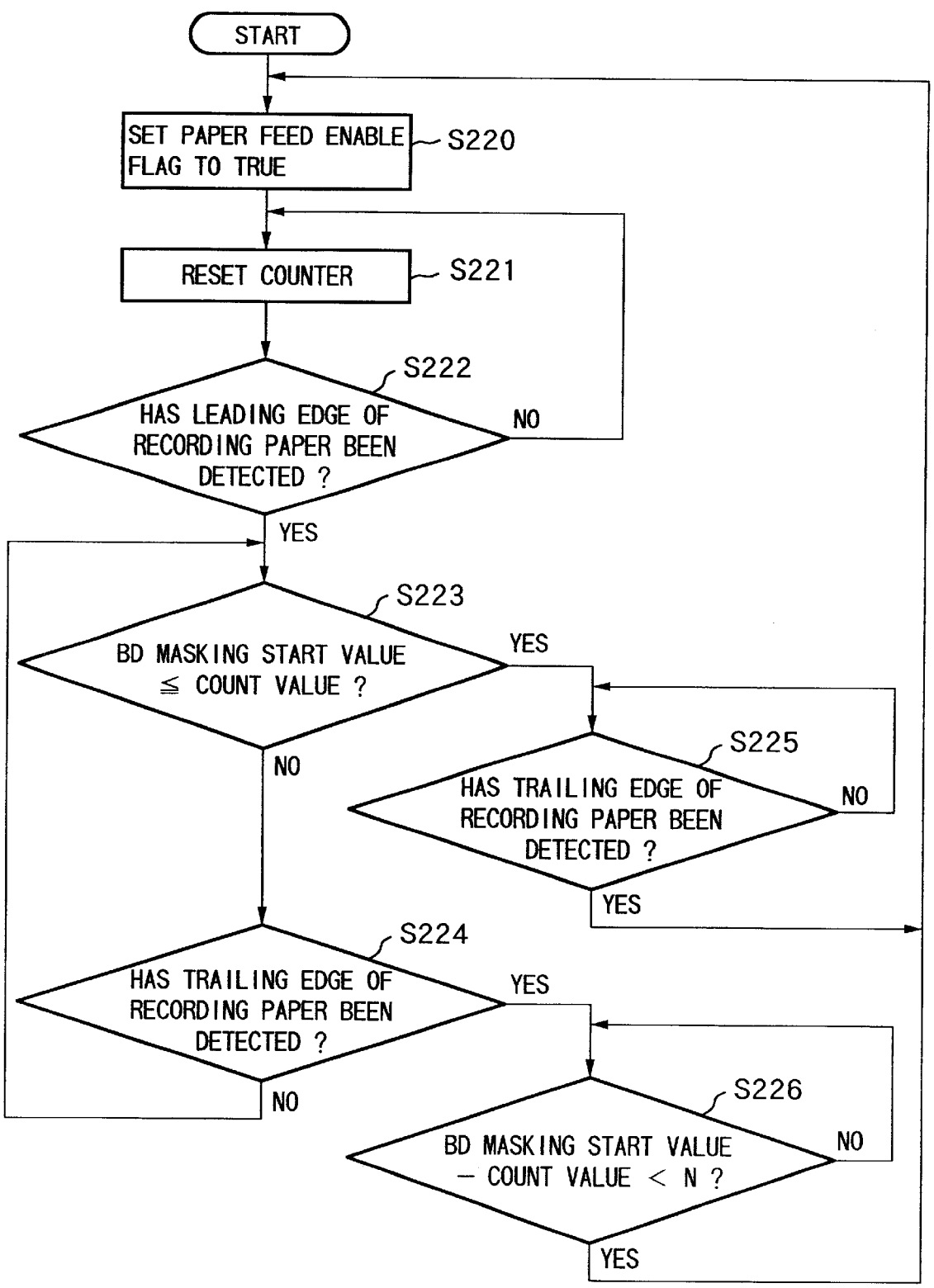
FIG. 6 is a flowchart illustrating another processing procedure for the second paper feed control.

The paper feed control will be now be described. FIG. 4 through FIG. 6 are flowcharts illustrating an example of the paper feed control performed by the CPU 54. When the power switch of the apparatus is turned ON, the paper feed control procedure is implemented. The following first and second paper feed controls will be conducted in parallel.

FIG. 4 shows the processing procedure related to the first paper feed control: if a paper feed enable flag is True in step S200 and if a printing instruction is received in step S201, then the paper feed enable flag is set to False in step S202, and the paper feed control of the recording paper is initiated in step S203.

FIG. 5 shows the processing procedure related to the second paper feed control: the paper feed enable flag is set to True in step S210, and the counter 73 continues to be cleared until the TOP sensor 10 detects the leading edge of the recording paper in steps S211 and S212. After the leading edge of the recording paper is detected, the CPU waits in step S213 until, for example, the difference, between the BD signal mask starting value given by the video controller 200 and the count value on the counter 73, becomes smaller than a predetermined value N, and when it reaches a value below the predetermined value N, the CPU goes back to step S210 wherein it switches the paper feed enable flag, which has been set to False by the processing shown in FIG. 4, to True to get ready for feeding the next sheet of recording paper.

The predetermined value N is set to a value which makes it possible to issue a BD signal for the required BD number specified for each type of recording paper when the feed of the next sheet of paper is begun when the value below the predetermined value N is reached, and also makes it possible to reduce the delay in feeding the recording paper so as to attain maximum printing speed.

FIG. 6 is a flowchart showing another processing procedure of the second paper feed control: the paper feed enable flag is set to True in step S220, and the counter 73 continues to be cleared until the TOP sensor 10 detects the leading edge of the recording paper in steps S221 and S222.

After the leading edge of the recording paper is detected, the CPU waits in step S223 until the count value on the counter 73 exceeds the BD signal mask starting value specified by the video controller 200 or it waits until the trailing edge of the recording paper is detected by the TOP sensor 10 in step S224.

If the count value on the counter 73 exceeds the BD signal mask starting value earlier, then the CPU waits until the trailing edge of the recording paper is detected by the TOP sensor in step S225; when the trailing edge is detected, the CPU goes back to step S220. If the trailing edge of the recording paper is detected before the count value exceeds the BD signal mask starting value, then the CPU waits until the difference, between the BD signal mask starting value and the count value of counter 73, reduces to a value below the predetermined value N in step S226, and when the difference reaches the value below the predetermined value N, the CPU returns to step S220. In step S220, the CPU switches the paper feed enable flag, which has been set to False by the processing shown in FIG. 4, to True to get ready for feeding the next sheet of recording paper.

(Error Message Informing)

Figure 7:
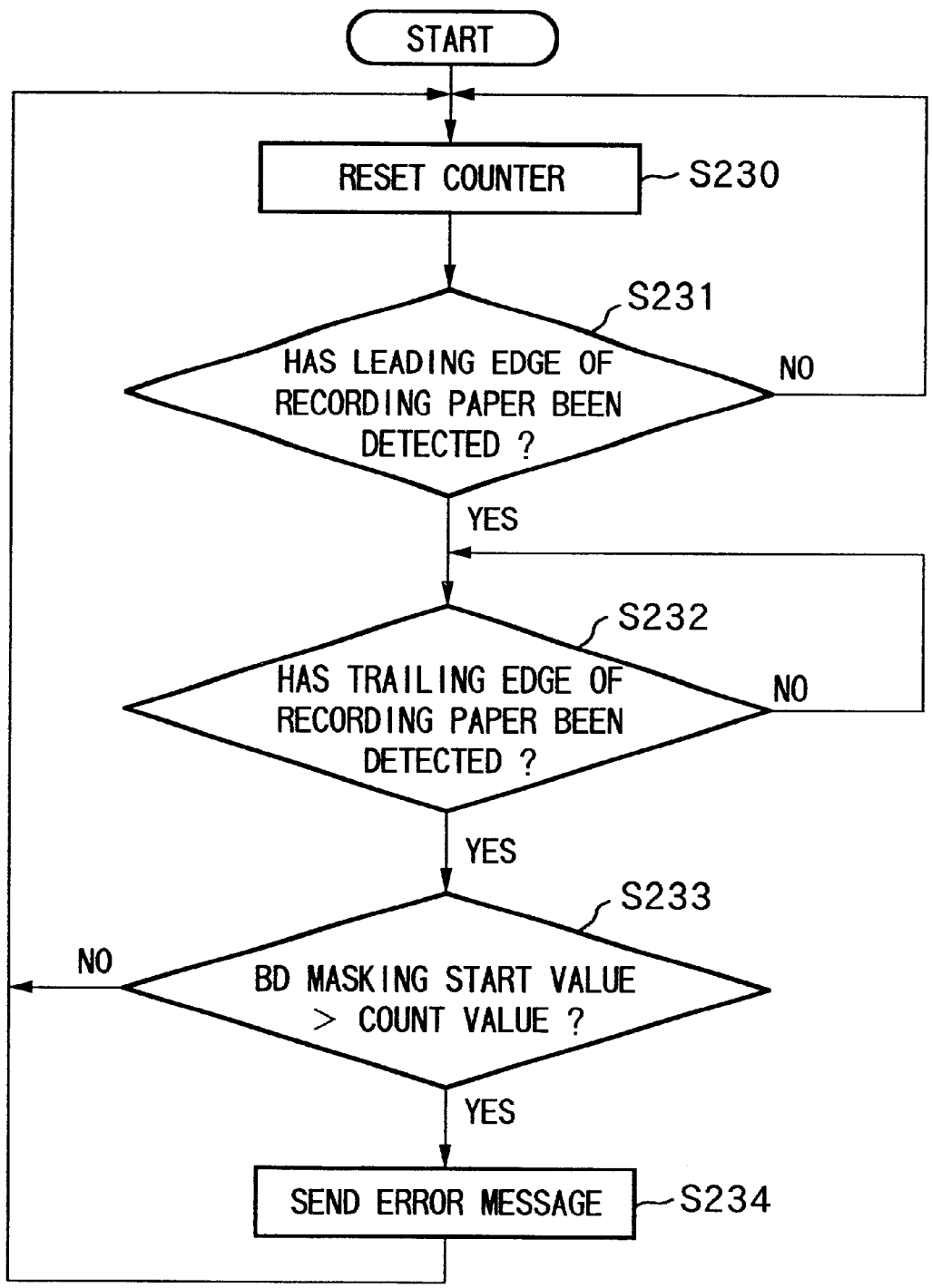
FIG. 7 is a flowchart illustrating an example of error message processing.
Figure 8:
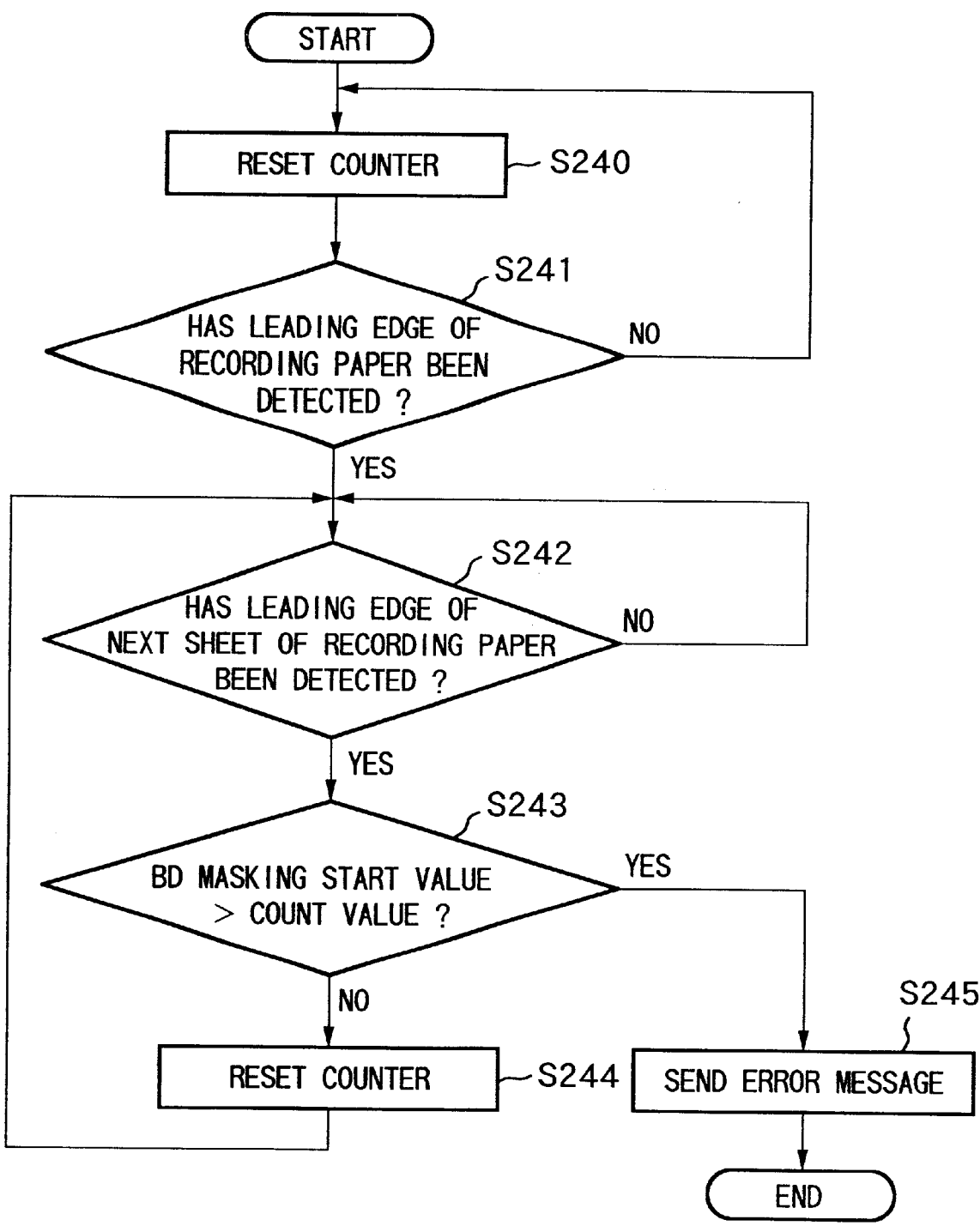
FIG. 8 is a flowchart illustrating another example of error message processing.

The error message processing procedure will now be described. FIG. 7 and FIG. 8 are flowcharts illustrating an example of the error message processing implemented by the CPU 54: the procedure is initiated upon turning the power of the apparatus ON.

In steps S230 and S231 of FIG. 7, the counter 73 continues to be cleared until the leading edge of the recording paper is detected by the TOP sensor 10. When the leading edge of the recording paper is detected, the CPU waits until the trailing edge of the recording paper is detected in step S232; when the trailing edge of the recording paper is detected, it compares the count value on the counter 73 with the BD signal mask starting value specified by the video controller 200 in step S233. If the count value is smaller than the BD signal mask starting value, then the CPU sends an error message, which indicates that the size of the recording paper is smaller than the size indicated by the specified required BD number, to the video controller 200 in step S234.

It is also possible to inhibit the output of subsequent BD signal signals or the printing operation afterwards in step S234. Alternatively, in the subsequent printing operation, the BD signal of the BD number corresponding to the count value obtained in step S233 may be issued.

As shown in FIG. 8, when printing is performed in succession, it is also possible to notify the video controller 200 that the BD signal for the first sheet of the recording paper overlaps the BD signal for the second sheet of the recording paper and the BD signal of the specified BD number failed to be issued.

First, in steps S240 and S241 of FIG. 8, the counter 73 continues to be cleared until the leading edge of the recording paper is detected by the TOP sensor 10. When the leading edge of the recording paper is detected, the CPU waits until the leading edge of the next sheet of the recording paper is detected in step S242. At this time, however, the counter 73 is not cleared.

When the leading edge of the recording paper is detected in step S242, the CPU compares the count value on the counter 73 with the BD signal mask starting value specified for the first sheet of the recording paper in step S243. If the count value of the counter 73 is smaller than the BD signal mask starting value, then the CPU notifies, in step S245, the video controller 200 that the aforesaid error has occurred. If the count value of the counter 73 is the BD signal mask starting value or more, then the CPU resets the counter 73 in step S244 before it returns to step S242 where it waits until the leading edge of the next sheet of recording paper is detected.

(Exchange of Information with Video Controller)

The exchange of information with the video controller will now be described.

Figure 9:
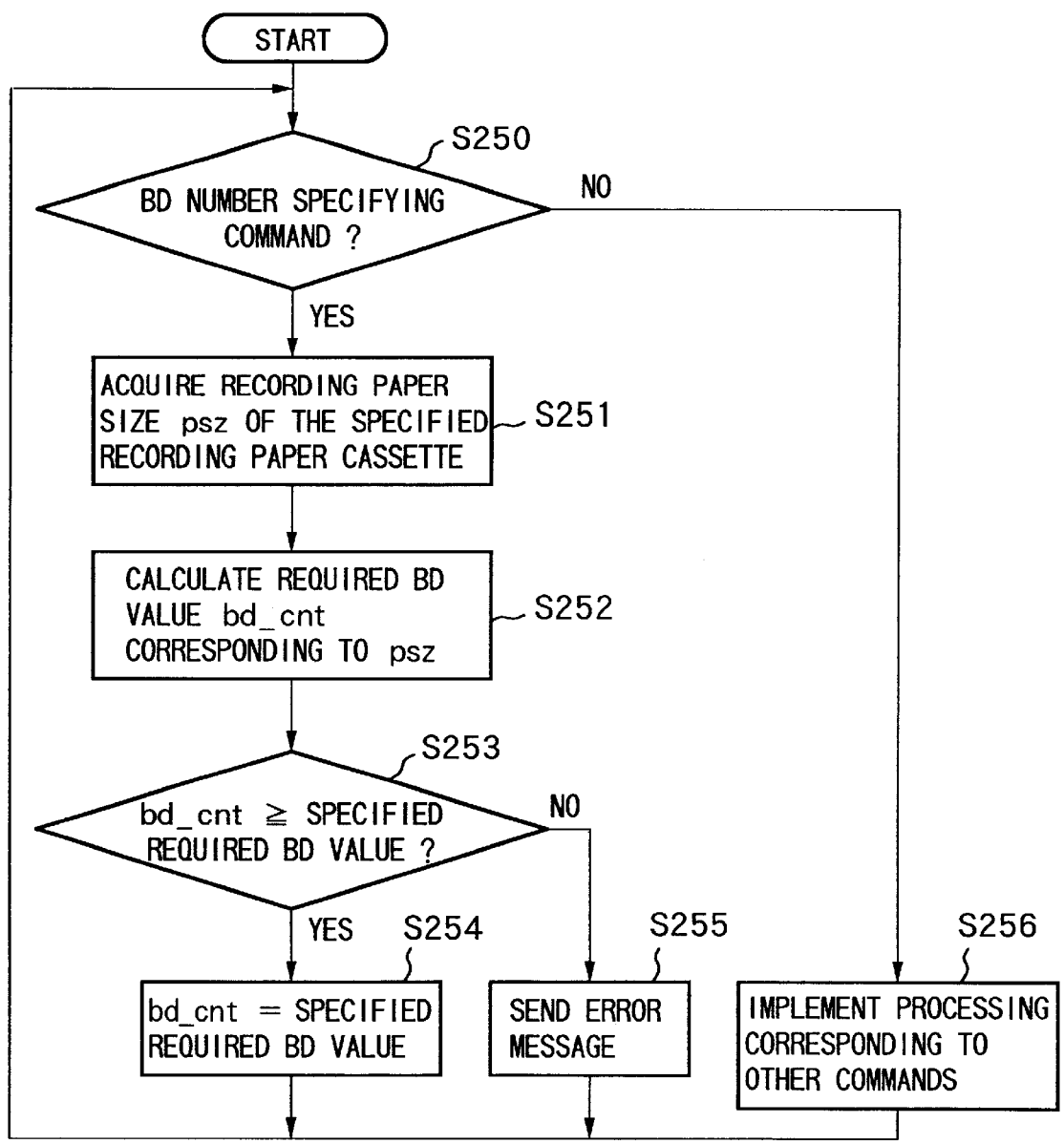
FIG. 9 is a flowchart illustrating an example of the exchange of information between a video controller and a printer engine.

The printer engine 100 and the video controller 200 exchange information; for example, the printer engine 100 notifies the video controller 200 of the state thereof, and the video controller 200 issues instructions to the printer engine 100. FIG. 9 shows the flowchart illustrating an example of the processing of information exchange implemented by the CPU 54.

In step S250, the CPU analyzes various commands received from the video controller 200 and determines whether the commands specify BD numbers: if the CPU decides that they are not the commands specifying the BD numbers, then it accepts or executes the commands or returns a status in step S256; if it decides that they are the commands specifying BD numbers, then it acquires the size of recording paper psz in the specified recording paper cassette in step S251, and it calculates the required BD number bd_cnt corresponding to the recording paper size psz in step S252. The required BD number bd_cnt is calculated from the formula shown below from length λ [mm] of the recording paper in the carrying direction, i.e. the sub-scanning direction, and resolution D [dpi]:

$$bd\_cnt = \lambda \times D / 25.4 \quad (1)$$

Figures 10, 11:
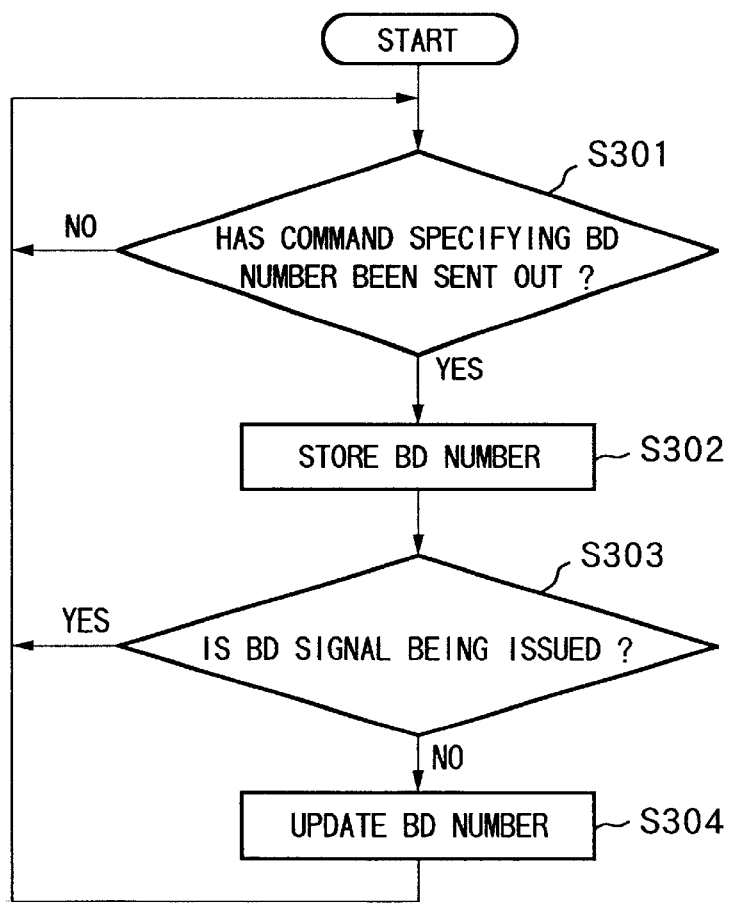
FIG. 10 is a diagram showing the required BD numbers for each type of recording paper when the resolution is 300 dpi.
FIG. 11 is a flowchart illustrating an example of an exchange of information between the video controller and the printer engine in a second embodiment in accordance with the present invention.

FIG. 10 shows the required BD numbers for the respective types of recording paper when the resolution is 300 dpi. In this example, the required BD numbers have been calculated on the assumption that the recording papers have the required sizes; however, some margin may be given by taking the variations in the recording paper size and the like into account. Obviously, it may be also possible to prepare a table as shown in FIG. 10, in which bd_cnt corresponding to psz has been stored, in a ROM or the like to determine bd_cnt from the table, thus obviating the need of calculating bd_cnt.

Next, in step S253, the CPU compares the required BD number specified by the video controller 200 with the bd_cnt obtained in step S252, and if the comparison result satisfies the condition given below, then the CPU sets the required BD number specified as bd_cnt:

$$bd\_cnt \geq \text{Specified required BD number} \quad (2)$$

During the printing operation after implementing step S254, the CPU 54 controls to issue a number of BD signals corresponding to a bd_cnt for one sheet of recording paper. If the condition of formula (2) is not satisfied, then the CPU sends an error message, which indicates that the specified required BD number is larger than the size of the recording paper, to the video controller 200 in step S255. It is also possible to conduct control so that the subsequent printing operation is inhibited until the video controller 200 gives a new required BD number.

Thus, according to the embodiment, the printer engine issues the synchronization signal related to the main scanning only during the period in which it is effective for the sub-scanning direction. Hence, the video controller does not have to generate two synchronization signals related to the main scanning and the sub-scanning as the synchronization signals required for forming an image, thus reducing the processing load thereof.

<Second Embodiment>

An image forming apparatus of a second embodiment in accordance with the present invention will now be described. In the second embodiment, approximately the same parts as those of the first embodiment will be assigned the same reference numerals and the description thereof will be omitted.

FIG. 11 is a flowchart illustrative of an example of the information exchange between a video controller 200 and a printer engine 100; the processing is implemented by a CPU 54.

In step S301, the CPU monitors whether the video controller 200 has sent out a command specifying the BD number, and if it decides that the command specifying the BD number has been sent out, then it proceeds to step S302. The CPU stores the BD number specified in step S302 in the RAM; it monitors the Q output of a JK-F/F 78 in step S303. If the output is an H-level, then it decides that the BD signal is being issued, i.e. an image is being formed, ignores the designation of the BD number and returns to step S301. If the Q output of the JK-F/F 78 is an L-level, then the CPU decides that the BD signal output is being masked and goes to step S304 wherein the CPU sets the value, which corresponds to the BD number stored in step S302, in shift registers 74 and 75 before the process returns to step S301.

In other words, even if the CPU receives a command specifying the BD number while an image is being formed, the CPU does not set the values for a new BD number in the shift registers 74 and 75. Thus, even if a new BD number is specified during the formation of an image, no malfunction results.

Figure 12:
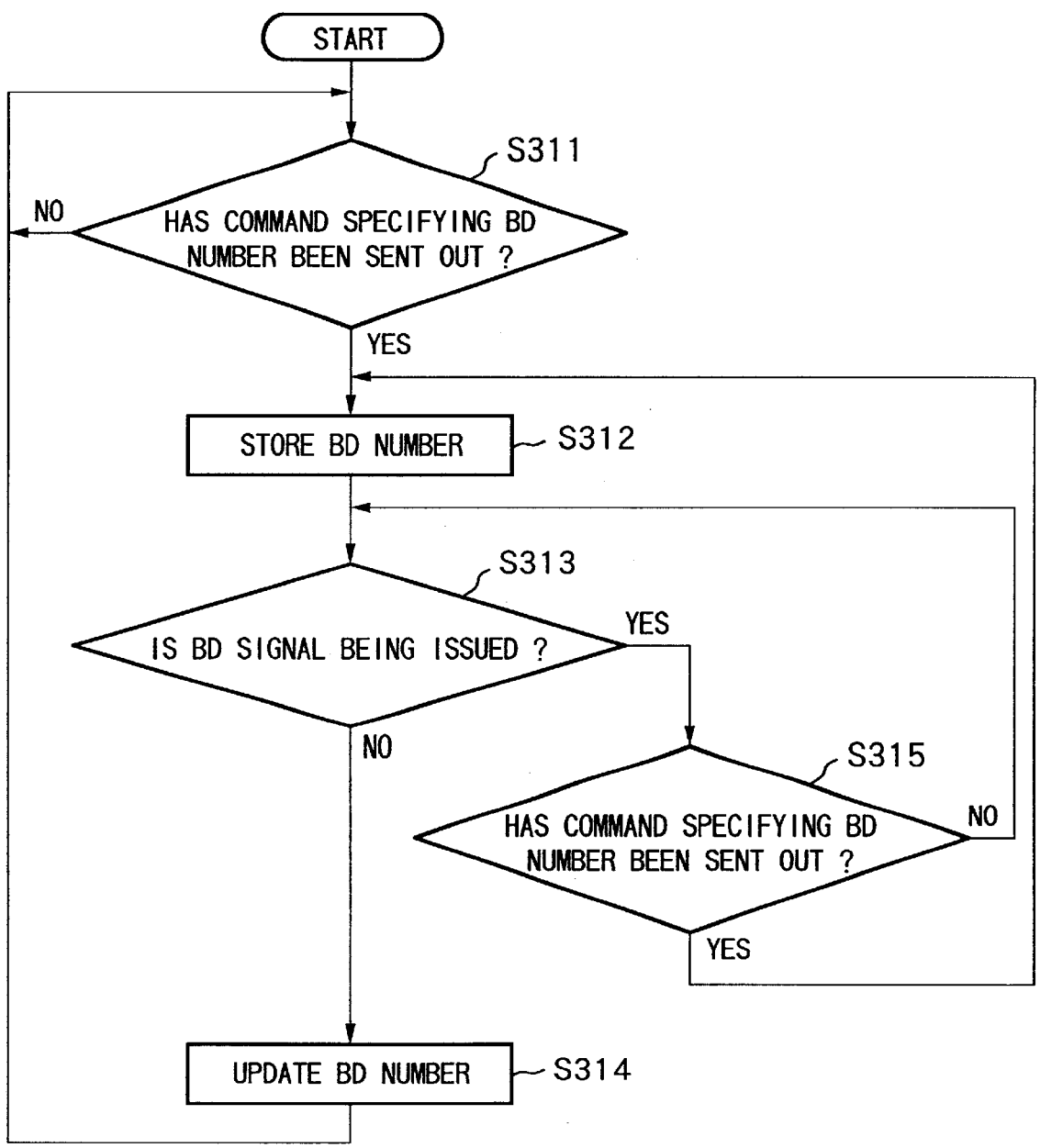
FIG. 12 is a flowchart illustrating another example of an exchange of information between the video controller and the printer engine.

FIG. 12 shows a flowchart illustrating another example of the information exchange between the video controller 200 and the printer engine 100; the CPU 54 implements the procedure.

In step S311, the CPU monitors whether or not the video controller 200 has sent out a command specifying the BD number, and if the CPU 54 decides that the command specifying the BD number has been sent out, then it proceeds to step S312. The CPU stores the BD number specified in step S312 in the RAM; the CPU 54 monitors the Q output of A JK-F/F 78 in step S313 and if the output is an L-level, then the CPU 54 decides that the output of the BD signal is being masked and proceeds to step S314 wherein the CPU 54 sets the value, which corresponds to the BD number stored in step S312, in shift registers 74 and 75 before the CPU 54 goes back to step S311. If the Q output of the JK-F/F 78 is an H-level, then the CPU proceeds to step S315 to monitor whether another command specifying the BD number has been sent out from the video controller 200 and if the command specifying the BD number has been sent out, then the CPU 54 goes back to step S312, or if the CPU 54 has not been sent out, then the CPU returns to step S313.

In other words, even if the CPU 54 receives a command specifying the BD number while an image is being formed, the CPU does not set the value for a new BD number in the shift registers 74 and 75. When the formation of the image is completed, the CPU sets the value corresponding to the stored BD number in the shift registers 74 and 75. Thus, even if a new BD number is specified during the formation of an image, no malfunction results; furthermore, the instructions received from the video controller 200 can be also executed.

If the CPU 54 detects a failure during cycle check in a state wherein the BD signal can be issued, that is, when the Q output of the JK-F/F 78 is an H-level, then the CPU 54 is able to notify the video controller 200 of the failure (hereinafter referred to as a BD error) found during the detection of the BD signal. Moreover, the CPU can carry out control so as to inhibit the output of the BD signal upon the detection of the BD error or inhibit the subsequent printing operation.

FIG. 13 is a flowchart illustrating an example of another processing implemented by the CPU 54.

In step S260, the CPU waits until the leading edge of the recording paper is detected by the TOP sensor 10; when the leading edge is detected, the CPU starts the output of the BD signal in step S261. After that, the CPU waits until the trailing edge of the recording paper is detected by the TOP sensor 10 in step S262; when the trailing edge of the recording paper is detected, the CPU stops the output of the BD signal in step S263 and returns to step S260.

(Other Embodiments)

The embodiments have been explained by taking an example wherein images are formed using a laser beam printer. The present invention, however, relates to the generation of the synchronization signals used for forming images, and it is obvious that the invention can be applied to other image forming apparatuses which employ similar synchronization signals.

The invention may be applied to a system comprised of a plurality of units such as a host computer, interface device, reader, and printer, or to an apparatus comprised of a single machine such as a copying machine or facsimile machine.

Obviously, the object of the invention is fulfilled by supplying a storage medium, in which the program code of the software for implementing the functions of the aforesaid embodiments has been recorded, to a system or an apparatus and by having a computer or CPU or MPU of the system or apparatus read and execute the program code stored in the storage medium. In this case, the program code itself read from the storage medium will implement the functions of the embodiments described above, and the storage medium which stores the program code will therefore constitute the invention. To supply the program code, such storage media as floppy disks, hard disks, optical disks, magneto-optical disks, CD-ROMs, CD-Rs, magnetic tape, nonvolatile memory cards, or ROMs may be used.

It is also obvious that the invention includes a case where executing the program code read by the computer implements the functions of the foregoing embodiments, and the operating system (OS) or the like running on the computer according to the instructions based on the program code carries out a part or all of actual processing to implement the functions of the foregoing embodiments.

Further, it is apparent that the invention includes a case where the program code read from the storage medium is written to a feature expansion card inserted in a computer or a memory provided on a feature expansion unit connected to the computer, then the CPU or the like provided in the feature expansion card or the feature expansion unit carries out a part or all of actual processing in accordance with the instructions based on the program code to implement the functions of the foregoing embodiments.

If the invention is applied to the foregoing storage medium, then the program code including the flowcharts described above will be stored in the storage medium. The program code may be independently loaded in the RAM of the video controller and in the RAM of the printer engine, it may be downloaded from the video controller to the printer engine, or it may be downloaded from a host computer to the video controller and the printer engine via the video controller; and various other configurations are possible.

It is also conceivable to configure the system such that the video controller notifies a host computer of the hardware and software functions of the video controller and the printer engine.

Thus, the present invention makes it possible to provide a method and an apparatus for forming an image which reduce the processing load on a video controller.

Although the invention has been described in detail above in connection with various preferred embodiments thereof, it will be appreciated by those skilled in the art that these embodiments have been provided solely for purposes of illustration, and are in no way to be considered as limiting the invention. Instead, various modifications and substitutions of equivalent techniques will be readily apparent to those skilled in the art upon reading this specification, and such modifications and substitutions are to be considered as falling within the true scope and spirit of the following claims.

What is claimed is:

1. An image forming apparatus comprising:

interface means for transmitting a horizontal synchronizing signal to an image signal generating apparatus, and for receiving an image signal transmitted from said image signal generating apparatus in response to the horizontal synchronizing signal;

cyclic signal generating means for generating a cyclic signal synchronized with a horizontal-scanning operation; and means for inhibiting transmission of the generated cyclic signal as the horizontal synchronizing signal to said image signal generating apparatus via said interface means before a first timing and allowing transmission of the generated cyclic signal as the horizontal synchronizing signal to said image signal generating apparatus via said interface means after the first timing, to instruct said image signal generation apparatus to transmit the image signal on a timing of a vertical synchronizing signal without transmitting said vertical synchronizing signal independent from said horizontal synchronizing signal to said image signal generating apparatus via said interface means.

2. The image forming apparatus according to claim 1, wherein said image forming apparatus forms an image by scanning an optical beam, and said cyclic signal generating means includes beam detecting means for detecting the scanned beam at a predetermined position.

3. The image forming apparatus according to claim 1, further comprising recording medium detecting means for detecting a supplied recording medium, wherein said first timing is specified based on the detection of a leading edge of the supplied recording medium by said recording medium detecting means.

4. The image forming apparatus according to claim 3, further comprising timer means, wherein said first timing is specified based on a predetermined number of time counts by said timer means after the detection of the leading edge of the supplied recording medium by said recording medium detecting means.

5. The image forming apparatus according to claim 3, wherein said image forming apparatus inhibits the transmission of the cyclic signal as the horizontal synchronizing signal to said image signal generating apparatus at a second timing after the first timing.

6. The image forming apparatus according to claim 5, wherein said second timing is specified based on the detection of a trailing edge of the supplied recording medium by said recording medium detecting means.

7. The image forming apparatus according to claim 5, wherein at least one of said first and second timings is set invariable based on designated information designated from said image signal generating apparatus.

8. The image forming apparatus according to claim 1, further comprising checking means for checking a generating cycle of the cyclic signal, and control means for controlling the means to inhibit the transmission of the cyclic signal to said image signal generating apparatus when the checking means detects that the generating cycle of the cyclic signal is abnormal.

9. A method of operating an image forming apparatus comprising the steps of:

transmitting a horizontal synchronizing signal to an image signal generating apparatus and receiving an image signal transmitted from said image signal generating apparatus in response to the horizontal synchronizing signal;

generating a cyclic signal synchronized with a horizontal-scanning operation; and inhibiting transmission of the generated cyclic signal as the horizontal synchronizing signal to said image signal generating apparatus before a first timing and allowing transmission of the generated cyclic signal as the horizontal synchronizing signal to said image signal generating apparatus after the first timing, to instruct said image signal generation apparatus to transmit the image signal on a timing of a vertical synchronizing signal without transmitting said vertical synchronizing signal independent from said horizontal synchronizing signal to said image signal generating apparatus.

10. The method according to claim 9, wherein said image forming operation includes scanning an optical beam, and said cyclic signal generating step includes detecting the scanned beam at a predetermined position.

11. The method according to claim 9, further comprising detecting a supplied recording medium, wherein said first timing is specified based on the detection of a leading edge of the supplied recording medium in said recording medium detecting step.

12. The method according to claim 11, further comprising generating time counts by timer means, wherein said first timing is specified based on a predetermined number of the time counts after the detection of the leading edge of the supplied recording medium in said recording medium detecting step.

13. The method according to claim 11, further comprising inhibiting the transmission of the cyclic signal as the horizontal synchronizing signal to said image signal generating apparatus at a second timing after the first timing.

14. The method according to claim 13 wherein said second timing is specified based on the detection of a trailing edge of the supplied recording medium in said recording medium detecting step.

15. The method according to claim 13, wherein at least one of said first and second timings is set invariable based on designated information designated from said image signal generating apparatus.

16. The method according to claim 9, further comprising checking a generating cycle of the cyclic signal, and inhibitting the transmission of the cyclic signal to said image signal generating apparatus when detecting that the generating cycle of the cyclic signal is abnormal.

17. An image signal generating apparatus comprising:

interface means for receiving a horizontal synchronizing signal which is synchronized with a horizontal-scanning operation and transmitting an image signal to an image forming apparatus synchronized with said horizontal synchronizing signal; and designating information generating means for generating designating information designating a first timing related to a vertical synchronization to output to said image forming apparatus via said interface means, wherein said image signal generating apparatus designates the first timing by said designating information and outputs the image signal in synchronization with said horizontal synchronizing signal, to transmit the image signal at a vertical synchronizing timing to said image forming apparatus without receiving a vertical synchronizing signal independent from said horizontal synchronizing signal from said image forming apparatus via said interface means.

18. The image signal generating apparatus according to claim 17, further comprising receiving means for receiving data from a high-level apparatus and converting means for converting the data received by said receiving meats into an image data to be transmitted to said image forming apparatus.

19. A method of controlling an image signal generating apparatus comprising the steps of:

receiving a horizontal synchronizing signal which is synchronized with a horizontal-scanning operation and transmitting an image signal to an image forming apparatus synchronized with said horizontal synchronizing signal; and generating designating information designating a first timing related to a vertical synchronization to output to said image forming apparatus, wherein said image signal generating apparatus designates the first timing by said designating information and outputs the image signal in synchronization with said horizontal synchronizing signal, to transmit the image signal at a vertical synchronizing timing to said image forming apparatus without receiving a vertical synchronizing signal independent from said horizontal synchronizing signal from said image forming apparatus.

20. The method according to claim 19, further comprising receiving data from a high-level apparatus and converting the data received into image data to be transmitted to said image forming apparatus.

21. An image forming system comprising an image forming apparatus and an image signal generating apparatus, (a) said image forming apparatus comprising:

first interface means for transmitting a horizontal synchronizing signal to an image signal generating apparatus, and for receiving an image signal transmitted from said image signal generating apparatus in response to the horizontal synchronizing signal;

cyclic signal generating means for generating a cyclic signal synchronized with a horizontal-scanning operation; and means for inhibiting transmission of the generated cyclic signal as the horizontal synchronizing signal to said image signal generating apparatus via said first interface means before a first timing and allowing transmission of the generated cyclic signal as the horizontal synchronizing signal to said image signal generating apparatus via said first interface means after the first timing, to instruct said image signal generation apparatus to transmit the image signal on a timing of a vertical synchronizing signal without transmitting said vertical synchronizing signal independent from said horizontal synchronizing signal to said image signal generating apparatus via said first interface means; and (b) said image signal generating apparatus comprising:

second interface means for receiving a horizontal synchronizing signal which is synchronized with a horizontal-scanning operation and transmitting an image signal to an image forming apparatus synchronized with said horizontal synchronizing signal, designating information generating means generating designating information designating a first timing related to a vertical synchronization to output to said image forming apparatus via said second interface means, wherein said image signal generating apparatus designates the first timing by said designating information and transmits the image signal in synchronization with said horizontal synchronizing signal to transmit the image signal at a vertical synchronizing timing to said image forming apparatus without receiving a vertical synchronizing signal independent from said horizontal synchronizing signal from said image forming apparatus via said second interface means.

22. The image forming system according to claim 21, wherein said image forming apparatus forms an image by scanning an optical beam, and said cyclic signal generating means includes beam detecting means for detecting the scanned beam at a predetermined position.

23. The image forming system according to claim 21, wherein said image forming apparatus further comprises recording medium detecting means for detecting a supplied recording medium, wherein said first timing is specified based on the detection of a leading edge of the supplied recording medium by said recording medium detecting means.

24. The image forming system according to claim 23, wherein said image forming apparatus further comprises timer means, wherein said first timing is specified based on a predetermined number of time counts by said timer means after the detection of the leading edge of the supplied recording medium by said recording medium detecting means.

25. The image forming system according to claim 23, wherein said image forming apparatus further inhibits the transmission of the cyclic signal as a horizontal synchronizing signal to said image signal generating apparatus at a second timing after the first timing.

26. The image forming system according to claim 25, wherein said second timing is specified based on the detection of a trailing edge of the supplied recording medium by said recording medium detecting means.

27. The image forming system according to claim 25, wherein said image signal generating apparatus further comprises output means for outputting information designating at least one of said first and second timings to said image forming apparatus, and said image forming apparatus sets at least one of said first and second timings invariable based on designated information designated from said image signal generating apparatus.

28. The image forming system according to claim 21, wherein said image forming apparatus further comprises checking means for checking a generating cycle of the cyclic signal, and control means for controlling the means to inhibit the transmission of the cyclic signal to said image signal generating apparatus when the checking means detects that the generating cycle of the cyclic signal is abnormal.

* * * * *

UNITED STATES PATENT AND TRADEMARK OFFICE
CERTIFICATE OF CORRECTION

PATENT NO. : 6,262,759 B1
DATED : July 17, 2001
INVENTOR(S) : Satoshi Akiyama et al.

It is certified that error appears in the above-identified patent and that said Letters Patent is hereby corrected as shown below:

Column 4,
Line 5, "outputs" should read -- outputs to --;
Line 8, "outputs" should read -- outputs to --; and
Line 42, "A page" should read -- a page --.

Column 5,
Line 19, "H15" should read -- H- --.

Column 6,
Line 7, "to" should read -- to as --; and
Line 21, "or" should read -- of -- .

Column 7,
Line 5, "or" should read -- of --.

Column 10,
Line 42, "A" should read -- a --.

Column 13,
Line 26, "generation" should read -- generating --.

Column 15,
Line 18, "signal" should read -- signal, --.

Signed and Sealed this

Fourteenth Day of May, 2002

*Attest:*

JAMES E. ROGAN
*Attesting Officer*      *Director of the United States Patent and Trademark Office*